United States Patent
Brandt et al.

(10) Patent No.: US 6,235,813 B1
(45) Date of Patent: May 22, 2001

(54) DISPERSANTS FOR PREPARING AQUEOUS PIGMENT PASTES

(75) Inventors: Petra Brandt, Duisburg; Eberhard Esselborn, Essen; Hans-Leo Karminski, Essen; Arno Knebelkamp, Essen; Christian Psiorz, Essen; Stefan Silber, Krefeld; Ellen Wallhorn, Essen, all of (DE)

(73) Assignee: Th. GoldSchmidt AG, Essen (DE)

( * ) Notice: Subject to any disclaimer, the term of this patent is extended or adjusted under 35 U.S.C. 154(b) by 0 days.

(21) Appl. No.: 09/370,537

(22) Filed: Aug. 9, 1999

(30) Foreign Application Priority Data

Aug. 11, 1998 (DE) .............................................. 198 36 253

(51) Int. Cl.[7] .................................................... C08G 65/02
(52) U.S. Cl. ............................................ 523/436; 528/393
(58) Field of Search .............................. 528/393; 523/436

(56) References Cited

U.S. PATENT DOCUMENTS 3,980,602   9/1976   Jakubauskas ..................... 260/29.6

FOREIGN PATENT DOCUMENTS

| 221 742 A1 | 5/1985 | (DE) . |
|---|---|---|
| 0 613 910 A2 | 2/1994 | (DE) . |
| 0 622 378 A1 | 4/1994 | (DE) . |
| 0 731 148 A2 | 2/1996 | (DE) . |
| 0791 024 B1 | 8/1997 | (DE) . |
| WO 94/21701 | 9/1994 | (WO) . |
| WO 96/14347 | 5/1996 | (WO) . |
| WO 97/19948 | 6/1997 | (WO) . |

OTHER PUBLICATIONS

Vinogradova et al.; Anionic Polymerization in Oxiranes. Polymerization of Methyl Methacrylate and 2–Vinylpyridine in Ethylene Oxide; American Chemical Society (1992), Macromolecules, vol. 25, No. 25; Dec. 7, 1992.

Garg et al.; Initiation of anionic polymerization of methyl methacrylate by living poly(ethylene oxide) anions, a new way for the synthesis of poly(ethylene oxide)–b–poly(methyl methacrylate); Makromol, Chem., Rapid Commun. 5, 615–618(1984);

Nagarajan et al.; Block copolymerization of poly(ethylene glycol) with methyl 1 methacrylate using redox macroinitiators; Die Angewandte Makromolekulare Chemie 245 (1997) 9–22 (Nr. 4245).

Suzuki et al.; Synthesis and Characterization of Block Copolymers of Poly(ethylene oxide) and Poly(methyl methacrylate); Polymer Journal, vol. 12, No. 3. pp. 183–192 (1980).

*Primary Examiner*—Edward J. Cain
(74) *Attorney, Agent, or Firm*—Frommer Lawrence & Haug LLP

(57) ABSTRACT

The invention relates to block-polymethacrylate-block-polyalkylene oxide copolymers with terminal carboxylic acids, of the general formula I

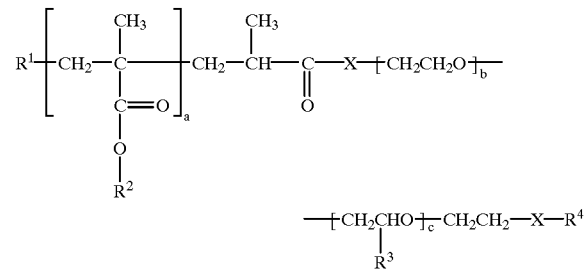

and to their use as a dispersing additive in aqueous pigment preparations and as a compatibilizer in SMC or BMC formulations.

19 Claims, No Drawings

DISPERSANTS FOR PREPARING AQUEOUS PIGMENT PASTES

RELATED APPLICATIONS

This application claims priority to German application no. 198 36 253.6, filed Aug. 11, 1998, herein incorporated by reference.

BACKGROUND OF THE INVENTION

1. Field of the Invention

The invention relates to polymethacrylates which are transesterified with polyetherdiols or amidated with polyetherdiamines and are subsequently functionalized at the ends, and to their use as dispersants for preparing aqueous pigment preparations.

2. Background of the Invention

In order to facilitate and to improve the dispersion of solids in liquid media it is common to employ dispersants, which at the same time are also intended to have a stabilizing effect on the resultant dispersions and to prevent reagglomeration or flocculation of the particulate solids. As surfactants, the dispersants promote wetting of the particulate solids to be dispersed, and aid in the disruption of agglomerates.

They are particularly important, for example, for the dispersion of pigments in the preparation of printing inks, paints and other coated materials and in the pigmentation of polymer compounds.

In addition, specific dispersants may act as compatibilizers to increase the compatibility between chemically different polymer types. This is of particular importance, for example, for the preparation of sheet molding compounds (SMC) and bulk molding compounds (BMC).

In the production of paints and other coating materials, wetting agents and dispersants facilitate the incorporation of pigments and fillers, which are important formulation constituents that significantly determine the visual appearance and the physicochemical properties of coatings. Optimum use requires firstly that these solids are distributed uniformly in paints and inks and secondly that the state of distribution, once attained, is stabilized. However, numerous problems may occur during the preparation and processing of aqueous pigment pastes:

- difficulties in incorporating the pigments, poor wetting
- high viscosities of color pastes, paints and other coating materials
- sedimentation
- vertical separation of pigments (flooding)
- horizontal separation of pigments (floating)
- low degree of gloss
- low hiding power
- inadequate color strength
- poor shade reproducibility, shade shift
- excessive tendency of coating materials to run There has therefore been no lack of attempts to provide effective dispersing additives for solids, especially pigments. For example, water-soluble polyisocyanate adducts containing hydrophilic polyether chains (EP-A-0 731 148), acidic poly(meth)acrylates (U.S. Pat. No. 3,980,602, WO-A-94/21701), phosphate esters of polyalkylene oxide block polyesters (WO-A-97/19948) or alternating copolymers of vinyl monomers and dicarboxylic diesters (WO-A-96/14347, EP-A-0 791 024), especially copolymers based on maleic acid derivatives and vinyl monomers, are described for this purpose.

However, the use of such products is also associated with a multiplicity of disadvantages. Frequently, for instance, high levels of dispersing additives are required, the levels of paste pigmentation that can be achieved are unsatisfactorily low, the stability of the pastes and thus of their viscosity is inadequate, and flocculation and aggregation cannot always be avoided; in many cases, there is also a lack of consistency of shade following storage of the pastes and a lack of compatibility with various binders. In many cases the use of known dispersing additives also has an adverse effect on the water resistance or light stability of coatings and, moreover, provides additional stabilization of the unwanted foam which is formed in the course of the preparation in processing. Furthermore, owing to deficiencies in the compatibility of the dispersing resins in numerous vehicles, there is often an undesirable impairment of the gloss.

The phosphoric esters of amphiphilic block copolymers, in particular, are characterized by poor stability of the phosphoric ester group to hydrolysis. The water resistance of coatings prepared with these esters is also adversely affected. Furthermore, these acidic phosphoric esters generally require an addition of amine base—undesirable in the amount required—in order, for example, to establish the optimized pH of a coating system.

OBJECT OF THE INVENTION

It is therefore an object of the present invention to overcome a multiplicity of the above disadvantages, the aim being to exert a positive influence on the important processing parameters of stability of paste viscosity, substantial avoidance of flocculation and aggregation, consistency of shade after paste storage, and resistance to water of coatings produced from the pastes.

A further aim of using these products is to improve the compatibility of chemically incompatible substances.

SUMMARY OF THE INVENTION

Surprisingly, it was discovered that these and other objects could be achieved, with the inventive dispersants, based on block-polymethacrylate-block-polyalkylene oxide copolymers with terminal carboxylic acid, of the general formula I

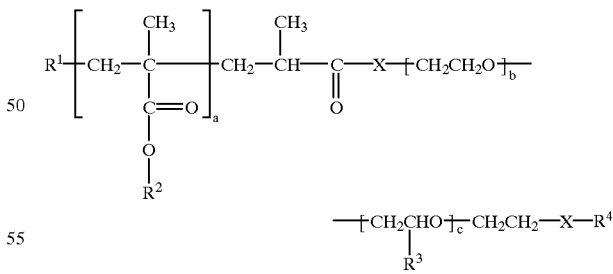

where $R^1$ is the radical of a conventional chain regulator or initiator which is free from active hydrogen atoms, $R^2$ are identical or different alkyl radicals or alternatively, optionally, are substituted aryl radicals, perfluoroalkyl radicals or dialkylamino radicals, $R^3$ are identical or different alkyl radicals or azyl radicals, $R^4$ is an organic radical having at least one carboxylic acid or carboxylate function, X is oxygen or NH, a is from 4 to 20, b is from 20 to 100, and c is from 0 to 20, the ratio b/c being ≧ about 4.

DESCRIPTION OF PREFERRED EMBODIMENTS

The radical $R^1$ is a conventional chain regulator or initiator. In accordance with the prior art, mention may be made of azo compounds or peroxides, by way of example. Examples of chain regulators are mercaptans, chloroform, isopropylbenzene and isopropanol. $R^1$ is preferably an aliphaticthio, more preferably an alkylthio of 1 to 22 carbon atoms, with the radical —S—$C_{12}H_{25}$ especially preferred. Further examples of radicals originating from the chain regulator, which are especially preferred, are the radicals derived from tert-dodecyl mercaptan, octadecyl and tetradecyl mercaptan.

$R^2$ is preferably an alkyl radical of 1 to 22 carbon atoms, more preferably 1 to 4 carbon atoms, with a methyl or butyl radical especially preferred. Preferred perfluoroalkyl radicals are those having 1 to 22 carbon atoms. Examples of especially preferred perfluoroalkyl radicals are the trifluoroethyl, pentafluoropropyl, nonafluorohexyl and tridecafluorooctyl radicals.

X is an oxygen atom if α,ω-polyalkoxyetherdiols are used and an NH group if α,ω-polyetherdiamines are used.

$R^3$ is an alkyl or aryl group. Preferably R is an alkyl group of 1 to 4 carbon atoms. Most preferably, $R^3$ is a methyl or phenyl group.

The indices b and c can be identical or different and are usually within the range from 20 to 100 for b and in the range from 0 to 20 for c. The ratio b:c here is preferably ≧ about 4. The different alkoxy units can be incorporated in blocks or else at random in the polyalkoxy chain. Examples of suitable alkoxylating agents are ethylene carbonate, propylene carbonate, styrene oxide, butylene oxide, especially propylene oxide and, in particular, ethylene oxide, and also mixtures thereof.

The radical $R^4$ contains at least one carboxylic acid unit or at least one carboxylate unit. Preferred radicals are aliphatic radicals having at least one carboxylic acid unit or at least one carboxylate unit. Examples of $R^4$ are all products resulting from the reaction of an alcohol with anhydrides. Preferred anhydrides are succinic anhydride, maleic anhydride, phthalic anhydride and trimellitic anhydride. Similarly, where X=NH the analogous monoamide compounds are formed.

Examples of $R^4$:

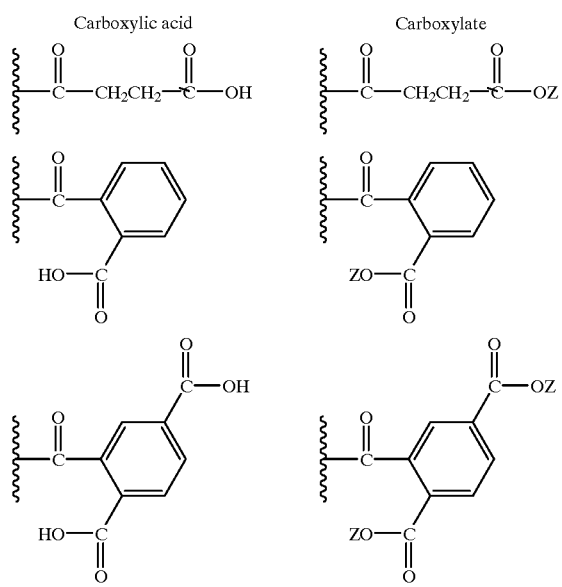

Z is a cation. Preferably, Z is an alkali metal or ammonium radical which may optionally be alkyl-bstituted. Examples of such substituted ammonium radicals are the radicals —$NH(CH_3)_3$, —$NH(C_2H_5)_3$ and —$NH(CH_2$—$C_6H_5)(CH_3)_2$. It is also possible to select the cations known from the prior art for carboxylic acid groups (e.g., neutralization with amines or amino alcohols, such as triethanolamine, aminomethylpropanol or dimethylethanolamine).

Examples of block copolymers of the invention are:

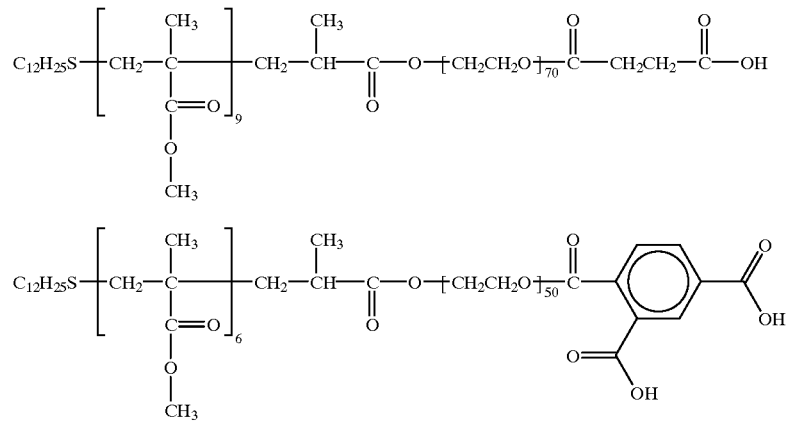

-continued

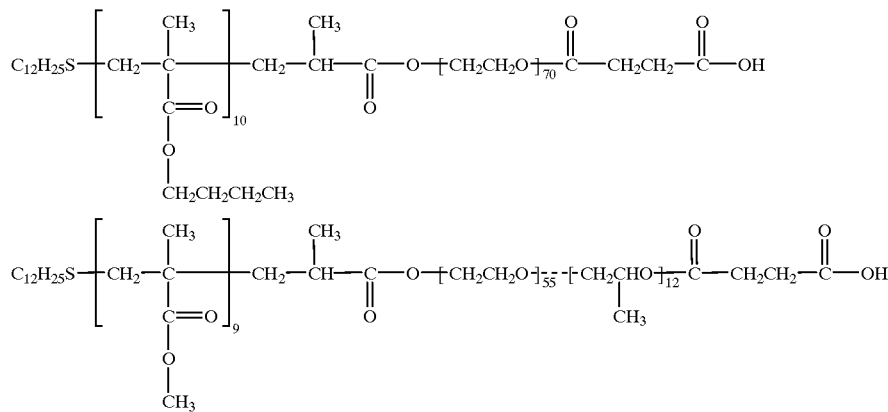

To prepare such block copolymers with terminal carboxylic acid, first the block-polymethacrylate-block-polyalkylene oxide copolymer with terminal hydroxyl or amino group is prepared and then this product is anionically functionalized at the end.

The preparation of polymethacrylate-block-polyalkylene oxide with terminal hydroxyl group is known from the literature. For example, Macromolecules (1992), 25 (25), 6733–6738, Polym. J. (1980), 12 (3), 183–192, the patent literature (DD-C-0 221 742), or Makromol. Chem., Rapid Commun. (1984), 5 (9), 615–618 describe the preparation of such block copolymers by anionic polymerization of methyl methacrylate and ethylene oxide using organolithium initiators. It is almost impossible to carry out such processes on the industrial scale. First, extremely high requirements are made of the purity of the reactants and any solvents used; second, the reaction temperatures required are usually very low (around −78° C.). The use of specific, sensitive alkali metal initiators (potassium naphthalide or diphenylmethylpotassium) is an additional hindrance to the implementation of the reaction.

Alternatively, block copolymers can be prepared starting from polyalkylene oxide and methacrylate monomers by redox polymerization based on $Ce^{4+}$. The literature gives a large number of examples of this, as, for example, in Angew. Makromol. Chem. (1997) 245, 9–22. The principal disadvantage of this reaction is that cerium(IV) ammonium nitrate is very expensive and has to be used in equimolar amounts. In addition, it has a very high molecular weight (MW 548.23); accordingly, approximately 1.1 kg of cerium(IV) ammonium nitrate would have to be used for just one mol of PEG3000.

The simplest preparation of block-polymethacrylate-block-polyalkylene oxide copolymers is that described in EP-A-0 613 910, which describes the endgroup transesterification of polymethacrylates with a wide variety of alcohols. In principle, this method is not limited to monoalcohols; instead, it is also possible to use dihydroxy-functional compounds, as has already been described in EP-A-0 622 378.

None of these patents, however, has described a further reaction of the terminal hydroxyl groups with anhydrides to form polymethacrylate-block-polyalkylene oxide compounds with a terminal carboxyl function. Surprisingly, it has been found that the desired block copolymers functionalized at the end can be prepared very simply by means of a one-pot reaction.

First in this reaction a polymethacrylate obtained by free-radical polymerization in the presence of a chain regulator is transesterified with α,ω-difunctional polyethers at temperatures from about 70 to about 150° C., preferably from 100 to 120° C. The reaction can be carried out with or without solvent. In general, residues of water are first removed from the system with an inert solvent, such as toluene or xylene, in order to remove any traces of moisture present. To simplify the removal from the reaction mixture of the alcohol liberated in the transesterification reaction (methanol or butanol, for example, depending on the polymethacrylate used) it is advisable to add an inert solvent, such as toluene, xylene or a petroleum fraction having a boiling range from about 70 to about 140° C. Prior art Lewis transesterification catalysts, such as alkyl titanate, alkyl zirconate, dialkyltin acetate halide or dialkyl tin dialkyl esters, can be used in amounts of from about 0.1 to about 3% by weight, based on the polymethacrylate. Particularly suitable catalysts are isopropyl titanate, dibutyltin acetate chloride, and dibutyltin oxide. The molar ratio of polymethacrylate to polyalkylene oxide can be from about 1:0.5 to about 1:3, preferably 1:1. The principal side reaction is the formation of the triblock copolymer polymethacrylate-block-alkylene oxide-block-polymethacrylate, which is not removed from the reaction mixture. The amount of byproduct is heavily influenced by the polymethacrylate/polyalkylene oxide ratio. The conversion can be monitored, inter alia, by determining the OH number.

Following complete conversion, the anionic modification can be carried out in a manner known per se. To this end, the corresponding anhydride is added and the reaction mixture is heated at a temperature from about 70 to about 150° C., preferably from 100 to 120° C. The molar ratio of anhydride to hydroxyl groups present can be from about 2:1 to about 1:10, preferably 1:1. All commercially available anhydrides can be employed. Examples of suitable anhydrides are succinic anhydride, maleic anhydride, phthalic anhydride and trimellitic anhydride. The end of the reaction can be determined from the disappearing OH number and developing acid number. It is also possible to use other prior art acylating agents, such as acid halides or esters.

EXAMPLES

The preparation of the block-polymethacrylate-block-polyalkylene oxide copolymers with terminal carboxylic acid for use as dispersants for aqueous pigment pastes were illustrated further in the following examples.

Example 1 A

Preparation of Polymethyl Methacrylate by Free-Radical Polymerization (not in accordance with the invention)

180 g of toluene were heated to 100° C. under a nitrogen atmosphere in a reactor. A solution of 4.2 g of azodiisobutyronitrile, 202.4 g of n-dodecyl mercaptan (1 mol) and 1198 g (about 12 mol) of methylmethacrylate in 170 g of toluene was added dropwise at 100° C. at a constant rate over the course of 3 hours. After the end of the reaction, the reaction mixture was reinitiated by adding 2.8 g of azodiisobutyronitrile over the course of 1 hour, after which reaction is allowed to continue for 1 hour more. Residual monomers and solvent were removed at 150° C. under an oil pump vacuum (1 torr) and the clear, viscous product was diluted to a solids content of 70% by adding toluene. The resultant polymer was found by gel chromatography to have an $M_n$ (calibration against PMMA/THF) of 1710 with an $M_w/M_n$ ratio of 1.56. The residual monomer content was <0.1%.

Examples 2 A and 3 A

Preparation of Polymethyl Methacrylates with Different Molecular Weights by Free-Radical Polymerization (not in accordance with the invention)

The procedure was basically the same as in Example 1 A with the difference that the amounts of n-dodecyl mercaptan and of initiator were varied as shown by Table 1.

TABLE 1

| Polymethyl methacrylate Ex. No. | Meth-acrylate [g]/[mol] | n-Dodecyl mercaptan [g] | Amount of initiator [g] | Molecular weight (GPC) $M_n$ | Poly-dispersity |
|---|---|---|---|---|---|
| 2 A | 898/9 | 202 | 3.3 | 1345 | 1.50 |
| 3 A | 598/6 | 202 | 2.4 | 945 | 1.45 |

Example 4 A

Preparation of Poly-n-butyl Methacrylate by Free-Radical Polymerization (not in accordance with the invention)

The procedure was basically the same as Example 1 A with the difference being that 10 molar equivalents of n-butyl methacrylate instead of 12 molar equivalents of methyl methacrylate were used per mole of n-dodecyl mercaptan.

The resulting polymer was found by gel chromatography to have an $M_n$ (calibration against PMMA/THF) of 2150 with an $M_w/M_n$ ratio of 1.78. The residual monomer content was <0.1%.

Example 5 A

Preparation of a Polystyrene-block-polyalkylene Oxide Copolymer (not in accordance with the invention; in analogy to DE-A41 34 967)

100 g of xylene was heated to 120° C. under a nitrogen atmosphere in a reactor which was provided with a stirrer. While maintaining the temperature of 120° C. a mixture of 2288 g (about 22 mol) of styrene, 78 g (1 mol) of 2-mercaptoethanol, 4.1 g of azodiisobutyronitrile and 310 g of xylene was added over the course of 3 hours. The end of the addition is followed by continued reaction for about 15 minutes; then 0.16 g of methylhydroquinone is added.

Vacuum distillation was used to remove excess monomer, xylene and residual amounts of 2-mercaptoethanol, and the colorless, viscous product which remains was finally diluted with xylene to a solids content of about 80%.

The molecular weight $M_n$ determined from the hydroxyl number was 1100 g/mol. Molecular weight determination by vapor pressure osmometry gave a value of 1200 g/mol. The resultant polymer was found by gel chromatography to have an $M_n$ (calibration against polystyrene/THF) of 1175 with an $M_w/M_n$ ratio of 1.75. The residual monomer content was <0.1%.

A solution of 1100 g (about 1 mol) of the ω-hydroxy-functional polystyrene in 200 g of xylene and 35.0 g of potassium methoxide (about 0.5 mol) were placed in a thoroughly dried stainless steel reactor with is additionally provided with a stirrer. Azeotropic distillation was used to remove not only traces of water but also methanol together with xylene. Subsequently, a temperature of 80° C. was established and about 3000 g of ethylene oxide (about 70 mol) were added rapidly with stirring such that the temperature within the reactor does not exceed 85° C. After all of the ethylene oxide has been introduced, 100 g of water were added and then a pH of 6 to 7 was established with 30% phosphoric acid. The water is removed by azeotropic distillation in vacuo, and the salt which precipitates is removed by filtration.

The molecular weight determined from the hydroxyl number, with an assumed functionality of 1, was 13.8 mg of KOH/g of polymer; the gel permeation chromatogram showed only one maximum and gave a value of 2880 for $M_n$ (calibration against polystyrene), giving 1.21 for the ratio $M_w/M_n$.

Examples 1 B to 4 B
(not in accordance with the invention)

The polyether diols used in the examples both in and not in accordance with the invention were prepared, starting from ethylene glycol as the starting alcohol, by alkali-catalyzed homopolymerization of 70 or 55 mol of ethylene oxide or, starting from propylene oxide, by blockwise copolymerization, again alkali-catalyzed, of propylene oxide (12 or 17 mol) and ethylene oxide (55 or 23 mol).

TABLE 2

| Example No. | PEG Molecular weight | EO/PO |
|---|---|---|
| 1 B | 3000 | pure EO |
| 2 B | 2200 | pure EO |
| 3 B | 3100 | 55/12 |
| 4 B | 2000 | 23/17 |

Example 1 C

Preparation of Block-polymethacrylate-block-polyalkylene Oxide Copolymers (not in accordance with the invention)

1400 g (about 1 mol) of the polymethyl methacrylate from Example 1 A (70% strength solution in toluene) and 3000 g (about 1 mol) of the polyether from Example 1 B were heated to 120° C. under a nitrogen atmosphere in a reactor and the solvent was removed by distillation, with simultaneous removal of traces of water. Then, at 100° C., 22 g (0.5% by weight) of isopropyl titanate were added and the methanol formed in the ensuing reaction was distilled off over a number of hours at 120° C. and 2 mm Hg. The course of the reaction can be monitored by gas-chromatographic analysis of the distillate for the amount of methanol it contains or by determining the OH number. After approximately 8 hours, conversion was quantitative and a yellow product was obtained which was solid at room temperature. The OH number was 12.9 mg of KOH/g of polymer. The resultant polymer was found by gel chromatography to have an $M_n$ (calibration against PMMA/THF) of 8730 with an $M_w/M_n$-ratio of 1.15.

Table 3 shows further examples of the synthesis of block-polymethacrylate-block-polyalkylene oxide copolymers obtained in accordance with the above preparation process.

TABLE 3

| Ex. No. | Polymethacrylate Ex./[g] | PEG Ex./[g] | Molecular weight (GPC) $M_n$ | Poly-dispersity | Mg of KOH /g of polymer |
|---|---|---|---|---|---|
| 2 C | 2 A/1100 | 1 B/3000 | 8150 | 1.21 | 13.9 |
| 3 C | 3 A/800 | 2 B/2200 | 7440 | 1.25 | 19.0 |
| 4 C | 4 A/1600 | 1 B/3000 | 8900 | 1.31 | 12.3 |
| 5 C | 2 A/1100 | 3 B/3100 | 7910 | 1.35 | 13.5 |
| 6 C | 1 A/1400 | 4 B/2000 | 7690 | 1.27 | 16.8 |

Example 1 D
Preparation of Block-polymethacrylate-block-polyalkylene Oxide Copolymers with a Terminal Carboxyl Group (in accordance with the invention)

Directly following the synthesis of the block-polymethacrylate-block-polyalkylene oxide 1 C, 98 g (about 1 mol) of maleic anhydride was added at 120° C. The reaction was completed after about 2 hours. The acid number of the material obtained was 12.4 mg of KOH/g of polymer.

Table 4 gives further examples of the reaction of block-polymethacrylate-block-polyalkylene oxide copolymers with a variety of anhydrides, obtained in accordance with the above preparation process.

TABLE 4

| Ex. NO. | Polymethacrylate Ex./[g] | PEG Ex./[g] | Anhydride | AN mg KOH/ g of polymer |
|---|---|---|---|---|
| 2 D | 2 A/1100 | 1 B/3000 | SAA | 13.5 |
| 3 D | 3 A/800 | 2 B/2200 | TAA | 17.2 |
| 4 D | 4 A/1600 | 1 B/3000 | SAA | 12.1 |
| 5 D | 2 A/1100 | 3 B/3100 | SAA | 12.5 |
| 6 D | 1 A/1400 | 4 B/2000 | SAA | 15.5 |

Example 7 D
Reaction of Succinic Anhydride (SAA) with Polystyrene-block-polyalkylene Oxide Copolymer 5 A (not in accordance with the invention)

The anionic modification was carried out as for 1 D except that on this occasion one molar equivalent of succinic anhydride was added directly after the synthesis. Following a reaction period of 2 hours at 150° C., the end of the reaction was determined from the acid number of 12.8 mg of KOH/g of polymer.

Example 8 D
Preparation of the Phosphoric Ester of Polystyrene-block-polyalkylene Oxide Copolymer 5 A (not in accordance with the invention)

4100 g (corresponding to 1 OH equivalent) of the block copolymer 5 A were charged to the reactor and after about 200 ml of toluene were added this initial charge was heated to 120° C. A vacuum was applied to remove all of the volatile components, and especially any water present in the product, from the reaction chamber by distillation. After nitrogen was passed in, the charge was heated to a constant temperature of 80° C. and 85 g of liquid polyphosphoric acid (0.25 mol of $P_4O_{10}$; manufacturer: Merck, purity calculated as $P_4O_{10}$: about 85%) are added. After 2 hours the reaction is at an end. The acid number of the material obtained is 26.8 mg of KOH/g. Aliphatic hydroxyl group were longer be detected in the $^1$H NMR spectrum.

Example 9 D
Preparation of the Phosphoric Ester of Polymethacrylate-block-polyalkylene Oxide Copolymer 1 C (not in accordance with the invention)

The reaction with polyphosphoric acid took place as for 8 D except that on this occasion 0.25 mol of $P_4O_{10}$ rather than an anhydride were added directly after the synthesis of 1 C. The end of the reaction was evident from the acid number of 25 mg of KOH/g of polymer.

Aqueous pigment pastes are prepared using from about 0.1 to 100% by weight of the block-polymethacrylate-block-polyalkylene oxide copolymers with terminal carboxylic acid of the invention, preferably from 0.5 to 50% by weight (based on the weight of the pigments). The copolymers of the invention can either be mixed beforehand with the pigments to be dispersed or dissolved directly in the dispersion medium (water, with or without additions of glycol ether) prior to or simultaneously with the addition of the pigments and any other solids.

To prepare aqueous, highly concentrated, pumpable and flowable pigment preparations, the polymer to be used in accordance with the invention, alone or in combination with at least one further component, is mixed with water, the pigment is scattered into this mixture with stirring, and dispersion is carried out until a suspension of the desired fineness and consistency is obtained.

A further method of preparing the pigment preparation of the invention is first to carry out dry mixing of a pigment with the copolymers of the invention to give a pulverulent pigment formulation. This formulation can be dispersed in water as and when required to give the pigment preparation of the invention.

A third method of preparing aqueous, highly concentrated, pumpable and flowable pigment suspensions and pigment pastes is to add the copolymer of the invention to a water-moist pigment filter cake and to incorporate it into the pigment filter cake, using for example a dissolver, in the course of which the filter cake becomes liquid.

Examples that may be mentioned of pigments to be dispersed are:

| | |
|---|---|
| Monoazo pigments: | C.I. Pigment Brown 25; |
| | C.I Pigment Orange 5, 36 and 67; |
| | C.I Pigment Red 1, 2, 3, 48:4, 49, 52:2,53,57:1,251, 112, 170 and 184; |
| | C.I. Pigment Yellow 1, 3, 73, 74, 65, 97, 151 and 183; |
| Diazo pigments: | C.I. Pigment Orange 34; |
| | C.I. Pigment Red 144 and 166 |
| | C.I. Pigment Yellw 12, 13, 17, 83, 113 and 126; |
| Anthraquinone pigments: | C.I. Pigment Yellow 147 and 177; |
| | C.I. Pigment Violet 31; |
| Anthrapyrimidine pigments: | C.I. Pigment Yellow 108; |
| Quinacridone pigments: | C.I.Pigment Red 122, 202 and 20; |
| | C.I.Pigment Violet 19; |
| Quinophthalone pigments: | C.I.Pigment Yellow 138; |
| Dioxazine pigments: | C.I.Pigment Violet 23 and 27; |
| Flavanthrone pigments: | C.I. Pigment Yellow 24; |
| Indanthrone pigments: | C.I. Pigment Blue 60 and 64; |
| Isoindoline | C.I. Pigment Orange 69; |

| pigments: | C.I. Pigment Red 260; C.I. Pigment Yellow 139; |
|---|---|
| Isoindolinone pigments: | C.I. Pigment Orange 61; C.I. Pigment Red 257 and 260 C.I. Pigment Yellow 109, 110, 173 and 185; |
| Metal complex pigments: | C.I. Pigment Yellow 117 and 153; |
| Perinone pigments: | C.I. Pigment Orange 43; C.I. Pigment Red 194; |
| Perylene pigments: | C.I. Pigment Black 31 and 32; C.I. Pigment Red 123, 149, 178, 179, 190 and 224; C.I. Pigment Violet 29; |
| Phthalocyanine pigments: | C.I. Pigment Blue 15, 15:1, 15:2, 15:3, 15:4, 15:6 and 16; C.I. Pigment Green 7 and 36; |
| Pyranthrone pigments: | C.I. Pigment Orange 51; C.I. Pigment Red 216; |
| Thioindigo-pigments: | C.I. Pigment Red 88; |
| Triphenylmethane pigments: | C.I. Pigment Blue 1, 61, and 62; C.I. Pigment Green 1; C.I. Pigment Red 81 and 169; C.I. Pigment Violet 2 and 3; |
| C.I. Pigment Black 1 (Aniline black) | |
| C.I. Pigment Yellow 101 (Aldazine yellow) | |
| Inorganic pigments: | |
| White pigments: | Titanium dioxide (C.I. Pigment White 6), zinc white, pigment-grade zinc oxide; zinc sulfide, lithopones; lead white; |
| Black pigments: | Iron oxide black (C.I. Pigment Black 11), iron manganese black, spinel black (C.I.Pigment Black 27); carbon black (C.I. Pigment Black 7); |
| Colored pigments: | Chromium oxide, chromium oxide hydrate green; chromium green (C.I. Pigment Green 48); cobalt green (C.I.Pigment Green 50); ultramarine green; Cobalt blue (C.I. Pigment Blue 28 and 36); ultramarine blue; |
| iron blue (C.I. Pigment Blue | 27); manganese blue; Ultramarine violet; cobalt and manganese violet; Iron oxide red (C.I. Pigment Red 101); cadmium sulfoselenide (C.I. Pigment Red 108); molybdate red (C.I. Pigment Red 104); ultramarine red; Iron oxide brown, mixed brown, spinel phases and corundum phases (C.I. Pigment Brown 24, 29 and 31), Chromium orange; Iron oxide yellow (C.I. Pigment Yellow 42); nickel titanium yellow (C.I. Pigment Yellow 53; C.J. Pigment Yellow 157 and 164); chromium titanium yellow, cadmium sulfide and cadmium zinc sulfide (C.I. Pigment Yellow 37 and 35); chromium yellow (C.I. Pigment Yellow 34), zinc yellow, alkaline earth metal chromates, Naples yellow, bismuth vanadate (C.I. Pigment Yellow |
| Luster pigments: | Metallic pigments based on metal oxide-coated metal flakes; pearl luster pigments based on metal oxide-coated mica platelets. |

Examples of fillers which can be dispersed, for example, in aqueous coating materials are those based on kaolin, talc, other silicates, chalk, glass fibers, glass beads, and metal powders.

Suitable coating systems into which the pigment preparations of the invention can be incorporated are any desired aqueous one- or two-component coating materials. Examples that may be mentioned are aqueous one-component coating materials such as, for example, those based on alkyd, acrylate, epoxy, polyvinyl acetate, polyester or polyurethane resins, or aqueous two-component coating materials, examples being those based on hydroxyl-containing polyacrylate or polyester resins with melamine resins or optionally blocked polyisocyanate resins as crosslinkers. Similarly, mention may also be made of poly-epoxy resin systems.

Water is the preferred solvent for the copolymers of the invention. However, organic solvents, such as glycol ethers or glycol esters, for example, can also be used, alone or in a mixture of water. The addition of solvents is advantageous in many cases especially for the initial drying behavior of the pigment pastes prepared using the copolymers of the invention.

To prepare the pigment preparations of the invention it is also possible, moreover, to add further water-dispersible polymers not in accordance with the invention, such as, for example, polyacrylate, polyurethane or polysiloxane derivatives.

For preparing the pigment preparations of the invention it is additionally possible to use further auxiliaries, such as defoamers, preservatives, wetting agents, devolatilizers, or prior art antisettling agents, waxes, and rheological additives.

The block-polymethacrylate-block-polyalkylene oxide-carboxylic acids used as dispersants for aqueous pigment pastes are described by the general formula I. In relation to that formula, the indices a, b and c and the radicals $R^1$ to $R^4$ and X have the values and definitions, respectively, shown in the following table.

| No. | a | B | c | $R^1$ | $R^2$ | $R^3$ | $R^4$ | X |
|---|---|---|---|---|---|---|---|---|
| 1 | 12 | 70 | 0 | $C_{12}H_{25}S$ | Me | — | MAA | O |
| 2 | 9 | 70 | 0 | $C_{12}H_{25}S$ | Me | — | SAA | O |
| 3 | 6 | 50 | 0 | $C_{12}H_{25}S$ | Me | — | TAA | O |
| 4 | 10 | 70 | 0 | $C_{12}H_{25}S$ | Bu | — | SAA | O |
| 5 | 9 | 55 | 12 | $C_{12}H_{25}S$ | Me | Me | SAA | O |
| 6 | 12 | 70 | 0 | $C_{12}H_{25}S$ | Me | — | H | O |
| 7 | 12 | 70 | 0 | $C_{12}H_{25}S$ | Me | — | POx | O |
| 8 | 10 | 70 | 0 | | styrene! | — | POx | O |
| 9 | 10 | 70 | 0 | | styrene! | — | SAA | O |
| 10 | 12 | 23 | 17 | $C_{12}H_{25}S$ | Me | Me | SAA | O |

Preparation of the Pigment Pastes

To prepare the pigment pastes, the dispersing additives in accordance with the invention (1 to 5) and not in accordance with the invention (6 to 10) were dissolved beforehand in water to give 40% strength solutions which were mixed with water and auxiliaries, and then the pigments were added. Dispersion takes place following the addition of grinding media (glass beads 2 to 3 mm, same volume as the pigment paste) for 1 (titanium dioxide) or 2 h (other pigments) in a Skandex shaker with air cooling.

Formulation of the White Pastes

The white pastes were formulated as follows (amounts in % by weight):

| | |
|---|---|
| 16.4 | water |
| 12.3 | additive solution, 40% strength |
| 1.0 | defoamer (e.g., Tego Foamex 810, Tego Chemie Service GmbH) |
| 70.0 | titanium dioxide 2160 (Kronos) |
| 0.3 | Aerosil A 200 (Degussa) |

Formulation of Black Pastes

The black pastes were formulated as follows (amounts in % by weight):

| | |
|---|---|
| 60.3 | water |
| 22.3 | additive solution, 40% strength |
| 1.0 | defoamer (e.g., Tego Foamex 810, Tego Chemie Service GmbH) |
| 1.4 | AMP 90 (Angus) |
| 15.0 | pigment-grade carbon black FW 200 (Degussa) |

Test Coating Materials

Transparent baking enamel based on a modified alkyd resin (amounts in % by weight)

| | |
|---|---|
| 70.88 | Resydrol VWA 5477, 40% strength (Hoechst) |
| 0.14 | defoamer (e.g., Byk 020, Byk-Chemie) |
| 0.68 | Bentone SD 1 (Rheox) |
| 8.24 | Maprenal MF 900 (Hoechst) |
| 0.14 | triethanolamine |
| 19.10 | water |
| 0.68 | Additol XW 395 (Hoechst) |
| 0.14 | Additol XW 329 |

Introduced Item 1 Initially and Added the Other Components with Stirring.

Dispersion clearcoat

| | |
|---|---|
| 97.0 | Neocryl XK 90 (Zeneca) |
| 3.0 | Texanol |

To prepare gray-pigmented paints, in each case 40.0 g of clearcoat were introduced initially, 14.2 g of white paste and 2.65 g of black paste were added, and the mixture is homogenized at 1500 rpm for 5 minutes. The samples were knife-coated onto aluminum panels in a wet film thickness of 100 μm and were either baked at 150° C. for 15 minutes following a flash-off period of minutes (baking enamel) or are dried at room temperature (dispersion coating).

Test of the Paste Stabilities

In order to determine the paste stabilities, the achievable initial viscosities and the viscosities after four weeks of storage at 50° C. were determined at two different shear rates (20 l/s and 1000 l/s).

White Pastes

| Sample | Viscosity/Pas immediate at 20 l/s | Viscosity/Pas immediate at 1000 l/s | Viscosity/Pas after 4 wks at 50° C. at 20 l/s | Viscosity/Pas after 4 wks at 50° C. at 1000 l/s |
|---|---|---|---|---|
| 1 | 3.0 | 9.6 | 3.4 | 0.7 |
| 2 | 2.8 | 0.5 | 3.2 | 0.7 |
| 3 | 2.7 | 0.5 | 3.0 | 0.6 |
| 4 | 3.2 | 0.5 | 3.7 | 0.5 |
| 5 | 2.5 | 0.6 | 3.0 | 0.7 |
| 6 | 2.9 | 0.7 | 5.0 | 1.1 |
| 7 | 1.9 | 0.4 | 2.5 | 0.7 |
| 8 | 2.1 | 0.4 | 2.6 | 0.6 |
| 9 | 2.6 | 0.5 | 3.8 | 0.8 |
| 10 | 4.0 | 0.8 | forms sediment | forms sediment |

Black Pastes

| Sample | Viscosity/dPas immediate at 20 l/s | Viscosity/dPas immediate at 1000 l/s | Viscosity/dPas after 4 wks at 50° C. at 20 l/s | Viscosity/dPas after 4 wks at 50° C. at 1000 l/s |
|---|---|---|---|---|
| 1 | 2.2 | 0.6 | 2.3 | 0.6 |
| 2 | 2.0 | 0.6 | 2.2 | 0.7 |
| 3 | 2.1 | 0.6 | 2.3 | 0.6 |
| 4 | 2.5 | 0.5 | 2.7 | 0.6 |
| 5 | 2.3 | 0.7 | 2.4 | 0.7 |
| 6 | 2.3 | 0.5 | 3.5 | 0.8 |
| 7 | 2.2 | 0.6 | 2.3 | 0.6 |
| 8 | 2.2 | 0.6 | 2.5 | 0.8 |
| 9 | 2.3 | 0.5 | 2.8 | 0.7 |
| 10 | 3.0 | 0.7 | forms sediment | forms sediment |

The excellent stability of the pigment paste of the invention is readily evident from the low increase in viscosity in each case. When the block copolymer 10, not in accordance with the invention, was used it was impossible to formulate storage-stable pigment concentrates.

Test of the Dispersing Properties

The test formulation were drawn down in a wet film thickness of 100 μm; after drying for six minutes, a rubout test was performed on ⅓ of the coated area. Baking or drying overnight, respectively, was followed after 24 hours in each case by calorimetric measurement of the drawdowns by means of an XP 68 spectrophotometer from X-Rite. Gloss and haze were determined using the haze-gloss instrument from Byk-Gardner.

Baking Enamel Based on Resydrol VWA 5477

| Sample | Luminance L | Delta E after rubout | Gloss (60° angle) |
|---|---|---|---|
| 1 | 44.0 | 0.4 | 53 |
| 2 | 43.6 | 0.2 | 57 |
| 3 | 44.2 | 0.2 | 58 |
| 4 | 44.8 | 0.5 | 57 |
| 5 | 43.8 | 0.5 | 54 |
| 6 | 44.0 | 1.1 | 47 |
| 7 | 44.2 | 0.9 | 50 |
| 8 | 44.3 | 2.6 | 60 |
| 9 | 43.9 | 2.1 | 53 |
| 10 | 41.9 | 4.6 | 41 |

Dispersoin Coating Based on Neocryl XK 90

| Sample | Luminance L | Delta E after rubout | Gloss (60° angle) | Haze |
|---|---|---|---|---|
| 1 | 48.5 | 0.3 | 40 | 110 |
| 2 | 49.0 | 0.1 | 41 | 108 |
| 3 | 49.1 | 0.3 | 40 | 107 |
| 4 | 49.5 | 0.5 | 41 | 110 |
| 5 | 49.3 | 0.5 | 38 | 106 |
| 6 | 47.8 | 0.8 | 37 | 110 |
| 7 | 48.4 | 0.8 | 43 | 105 |
| 8 | 49.5 | 0.7 | 45 | 103 |
| 9 | 49.0 | 0.9 | 40 | 110 |
| 10 | 47.0 | 2.0 | 37 | 100 |

The favorable development in color strength that were obtained by using the dispersing additives of the invention, and the rubout test, which gave favorable results in every case, were evident.

Testing of the Water Resistance

The baked (Resydrol) system or the system air-dried at room temperature for 7 days (Neocryl system), in the form of gray-pigmented films, were exposed for 20 hours to standing water and then examined for surface defects (blistering/shade shift) and softening.

| Sample | Surface defects | Softening |
|---|---|---|
| 1 | none | minimal |
| 2 | none | minimal |
| 3 | none | minimal |
| 4 | none | minimal |
| 5 | none | minimal |
| 6 | none | minimal |
| 7 | considerable | considerable |
| 8 | considerable | considerable |
| 9 | none | minimal |
| 10 | none | minimal |

The active substances of the invention, especially in comparison with analogous phosphoric esters, do not impair the water resistance of the coating films.

As is evident from the above comparisons, the compounds to be used in accordance with the invention are notable for their universal applicability, the ease of preparation of stable pigment pastes, the levels of pigmentation that can be achieved, the attainable shade stabilities, and the improvement which can be obtained in the water resistance of filmed coatings.

The above description of the invention is intended to be illustrative and not limiting. Various change modifications in the embodiments described herein may occur to those skilled in the art Those changes can be made without departing from the scope or spirit of the invention.

What is claimed is:

1. A block-polymethacrylate-block-polyalkylene oxide copolymer with terminal carboxylic acid, of the general formula I

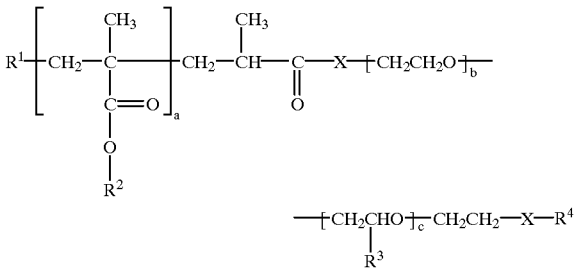

where
  $R^1$ is the radical of a conventional chain regulator or initiator which is free from active hydrogen atoms,
  $R^2$ is identical or different and is an alkyl radical, substituted aryl radical, perfluoroalkyl radical or dialkylamino radical,
  $R^3$ is identical or different and is an alkyl radical or aryl radical,
  $R^4$ is an organic radical having at least one carboxylic acid or carboxylate function,
  X is oxygen or NH,
  a is from 4 to 20,
  b is from 20 to 100, and
  c is from 0 to 20, the ratio b/c is $\geq$ about 4.

2. A block-polymethacrylate-block-polyalkylene oxide copolymer with terminal carboxylic acid as claimed in claim 1, wherein $R^2$ is an alkyl radical of 1 to 22 carbon atoms.

3. A block-polymethacrylate-block-polyalkylene oxide copolymer with terminal carboxylic acid as claimed in claim 1, wherein $R^3$ is an alkyl radical of 1 to 4 carbon atoms.

4. A block-polymethacrylate-block-polyalkylene oxide copolymer with terminal carboxylic acid as claimed in claim 1, wherein X is oxygen.

5. A block-polymethacrylate-block-polyalkylene oxide copolymer with terminal carboxylic acid as claimed in claim 1, wherein c is 0.

6. A block-polymethacrylate-block-polyalkylene oxide copolymer with terminal carboxylic acid as claimed in claim 1, wherein a is from 6 to 15.

7. A block-polymethacrylate-block-polyalkylene oxide copolymer with terminal carboxylic acid as claimed in claim 1, wherein $R^4$ is an aliphatic radical having at least one carboxylic acid or carboxylate function.

8. A block-polymethacrylate-block-polyalkyene oxide copolymer with terminal carboxylic acid as claimed in claim 7, wherein $R^4$ is $-C(O)CH_2CH_2-COOH$.

9. A block-polymethacrylate-block-polyalkylene oxide copolymer with terminal carboxylic acid as claimed in claim 1, wherein
  $R^1$ is the radical of a conventional chain regulator or initiator which is free from active hydrogen atoms,
  $R^2$ is identical or different and is an alkyl radical of 1 to 22 carbon atoms, substituted aryl radical, perfluoroalkyl radical or dialkylamino radical,
  $R^3$ is identical or different and is an alkyl radical of 1 to 4 carbon atoms or a phenyl radical,
  $R^4$ is an organic radical having at least one carboxylic acid or carboxylate function,
  X is oxygen or NH,
  a is from 4 to 20,
  b is from 20 to 100, and
  c is from 0 to 20, the ratio b/c is $\geq 4$.

10. A block-polymethacrylate-block-polyalkylene oxide copolymer where $R^1$ is a n-dodecylmercapto, tert-dodecylmercapto, octadecylmercapto or a tetradecylmercapto radical.

11. A block-polymethacrylate-block-polyalkylene oxide copolymer where $R^4$ is selected from the group consisting of

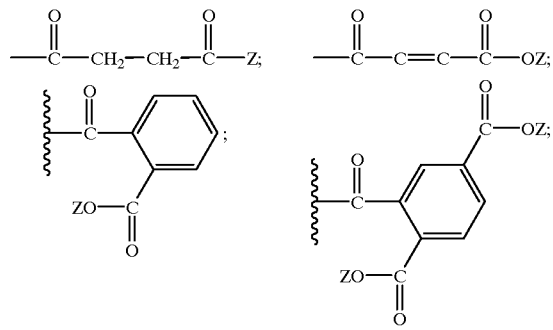

where Z is hydrogen, an alkali metal, or an ammonium radical which is optionally substituted by alkyl or benyl group.

12. A block-polymethacrylate-block-polyalkylene oxide copolymer as claimed in claim 11, where Z is $-NH(CH_3)_3$, $-NH(C_2H_5)_3$, and $-NH(CH_2-C_6H_5)(CH_3)_2$.

13. A block-polymethacrylate-block-polyalkylene oxide copolymer where the block copolymer is:

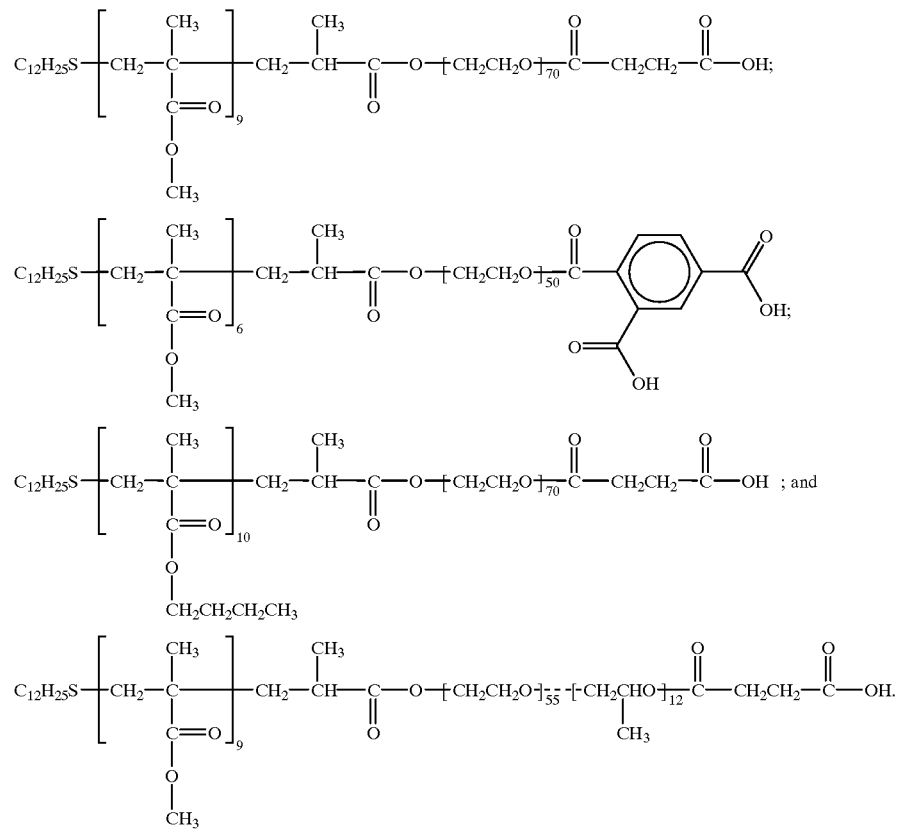

14. An aqueous pigment preparation comprising at least one organic or inorganic pigment and a dispersant comprising at least one block-polymethacrylate-block-polyalkylene oxide copolymer with terminal carboxylic acid as claimed in claim 1.

15. An aqueous pigment preparation as claimed in claim 14, wherein the amount of block-polymethacrylate-block-polyalkylene oxide copolymer with terminal carboxylic acid is from about 1 to 100% by weight, based upon pigment.

16. A one-pot process for preparing a block-polymethacrylate-block-polyalkylene oxide copolymer with terminal carboxylic acid as claimed in claim 1, which comprises transesterifying a polymethacrylate, obtained by free-radical polymerization with α, ω-difunctional polyethers, in the presence of a chain regulator and a Lewis acid transesterification catalyst at a temperature from about 70 to about 150° C., optionally in the presence of a solvent, and reacting the product thus formed with an anhydride and heating the reaction mixture at a temperature from about 70 to about 150° C.

17. A method of dispersing solids in a liquid media which comprises adding a block-polymethacrylate-block-polyalkylene oxide copolymer as claimed in claim 1 to said media.

18. A method for increasing the compatibility of chemically different polymer types which comprises adding a block-polymethacrylate-block-polyalkylene oxide copolymer to said polymers.

19. In a method for preparing SMC or BMC formulations, the improvement which comprises adding to said formulation a block-polymetacrylate-block-polyalkylene oxide copolymer with terminal carboxylic acid as claimed in claim 1.

* * * * *